US012122939B2

United States Patent
Kim et al.

(10) Patent No.: US 12,122,939 B2
(45) Date of Patent: Oct. 22, 2024

(54) ANTIBACTERIAL POLYMER COATING COMPOSITION AND ANTIBACTERIAL POLYMER FILM

(71) Applicant: LG CHEM, LTD., Seoul (KR)

(72) Inventors: Mingoo Kim, Daejeon (KR); Miyeon Oh, Daejeon (KR); Jeehyon Min, Daejeon (KR); Jinkyu Lee, Daejeon (KR); Hong Shik Shim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 623 days.

(21) Appl. No.: 17/258,691

(22) PCT Filed: Jan. 13, 2020

(86) PCT No.: PCT/KR2020/000609
§ 371 (c)(1),
(2) Date: Oct. 11, 2021

(87) PCT Pub. No.: WO2020/159110
PCT Pub. Date: Aug. 6, 2020

(65) Prior Publication Data
US 2022/0041868 A1  Feb. 10, 2022

(30) Foreign Application Priority Data
Jan. 31, 2019  (KR) .................. 10-2019-0013060

(51) Int. Cl.
*C09D 5/14* (2006.01)
*C08F 2/50* (2006.01)
(Continued)

(52) U.S. Cl.
CPC .................. *C09D 5/14* (2013.01); *C08F 2/50* (2013.01); *C08F 220/22* (2013.01);
(Continued)

(58) Field of Classification Search
CPC ....... C09D 5/14; C09D 133/08; C08F 222/10; C08F 220/22; C08F 2/50; C08J 5/18
(Continued)

(56) References Cited
U.S. PATENT DOCUMENTS
5,106,872 A     4/1992  Alder et al.
2010/0135949 A1  6/2010  Ou-Yang
(Continued)

FOREIGN PATENT DOCUMENTS
CN  101945955 A  1/2011
CN  110114420 A  8/2019
(Continued)

OTHER PUBLICATIONS

P. Sautrot-Ba et al., "Eosin-mediated synthesis of polymer coatings combining photodynamic inactivation and antimicrobial properties", Journal of Materials Chemistry B, 2017, vol. 5, No. 36, pp. 7572-7582.

(Continued)

*Primary Examiner* — Deve V Hall
(74) *Attorney, Agent, or Firm* — ROTHWELL, FIGG, ERNST & MANBECK, P.C.

(57) ABSTRACT

The present disclosure relates to an antibacterial coating composition including a (meth)acrylate-based monomer or oligomer containing an alkylene oxide having 1 to 10 carbon atoms; a compound represented by the following Chemical Formula 1; and a photoinitiator, an antibacterial polymer film including a cured product of the antibacterial polymer coating composition, and an antibacterial polymer film including a polymer resin containing a (meth)acrylate-based repeating unit having an introduced alkylene oxide functional group having 1 to 10 carbon atoms; and a compound represented by the following Chemical Formula 1 dispersed in the polymer resin, wherein antibacterial activity measured according to JIS R 1702 (KS L ISO 27447; 2011) is 99% or more:

[Chemical Formula 1]

in Chemical Formula 1,
at least one of R is and the rest are hydrogen,
$R_1$ is hydrogen, C1 to C5 alkyl, or C1 to C5 alkoxy,
k is an integer of 1 to 5, and
n is an integer of 1 to 20.

17 Claims, 3 Drawing Sheets

(51) Int. Cl.
- *C08F 220/22* (2006.01)
- *C08F 222/10* (2006.01)
- *C08J 5/18* (2006.01)
- *C08K 5/3415* (2006.01)
- *C09D 133/08* (2006.01)

(52) U.S. Cl.
CPC .... *C08F 222/103* (2020.02); *C08F 222/1063* (2020.02); *C08J 5/18* (2013.01); *C08K 5/3415* (2013.01); *C09D 133/08* (2013.01)

(58) Field of Classification Search
USPC .......................................................... 523/122
See application file for complete search history.

(56) References Cited

U.S. PATENT DOCUMENTS

| | | | |
|---|---|---|---|
| 2014/0314826 A1 | 10/2014 | Williams et al. | |
| 2018/0369798 A1 | 12/2018 | Takamori et al. | |
| 2020/0085057 A1* | 3/2020 | Jeong | C09D 4/00 |

FOREIGN PATENT DOCUMENTS

| | | |
|---|---|---|
| JP | H02-286607 A | 11/1990 |
| JP | 2005-112791 A | 4/2005 |
| JP | 2012-510559 A | 5/2012 |
| JP | 2016-183117 A | 10/2016 |
| JP | 6041360 B2 | 12/2016 |
| KR | 10-2014-0080863 A | 7/2014 |
| KR | 10-2019-0044971 A | 5/2019 |
| TW | 201529761 A | 8/2015 |
| WO | 99-49823 A1 | 10/1999 |
| WO | 2006-115271 A1 | 11/2006 |
| WO | 2014-098422 A1 | 6/2014 |
| WO | WO-2019074270 A1 * | 4/2019 ............. A01N 25/10 |
| WO | 2019-083259 A1 | 5/2019 |

OTHER PUBLICATIONS

Berlin et al., "Are Porphyrin Mixtures Favorable Photodynamic Anticancer Drugs? A Model Study with Combinatorial Libraries of Tetraphenylporphyrins", Biotechnology and Bioengineering, 1998, vol. 61, No. 2, pp. 107-118.

Xin Deng, et al., "A Facile Strategy to Generate Polymeric Nanoparticles for Synergistic Chemo-photodynamic Therapy", Chemical Communications, 2015, vol. 51, No. 20, pp. 4271-4274.

D. Wohrle, et al., "Metal chelates of porphyrin derivatives as sensitizers in photooxidation processes of sulfur compounds and in photodynamic therapy of cancer", Russian Chemical Bulletin, 1994, vol. 43, No. 12, pp. 1953-1964.

Andrew Mills et al., "An overview of semiconductor photocatalysis", Journal of Photochemistry and Photobiology A: Chemistry, vol. 108, 1997, pp. 1-35.

Kang-Kyun Wang, et al., "Bactericidal effect through non-uptake pathway with photofunctional silicon polymer that generates reactive oxygen species", Journal of Photochemistry and Photobiology A: Chemistry, vol. 315, 2016, pp. 52-58.

International Search Report issued for International Application No. PCT/KR2020/000609 on May 12, 2020, 6 pages.

* cited by examiner

[FIG. 1]

After light irradiation, the bacterial suspension is recovered and plated for quantification

FIG. 3

ANTIBACTERIAL POLYMER COATING COMPOSITION AND ANTIBACTERIAL POLYMER FILM

CROSS-REFERENCE TO RELATED APPLICATION(S)

This application is a 35 U.S.C. 371 National Phase Entry Application from PCT/KR2020/000609, filed on Jan. 13, 2020, designating the United States, which claims the benefit of priority from Korean Patent Application No. 10-2019-0013060 filed on Jan. 31, 2019 in the Korean Intellectual Property Office, the disclosures of which are incorporated herein by reference in their entirety.

BACKGROUND OF THE INVENTION

Field of the Invention

The present disclosure relates to an antibacterial polymer coating composition and an antibacterial polymer film.

Background of the Invention

A photosensitizer absorbs light to produce reactive oxygen species (ROS), and photodynamic therapy (PDT), in which the photosensitizer is excited upon irradiation with light of a specific wavelength from the outside to generate active oxygen species or free radicals, thereby inducing apoptosis of various lesions or cancer cells and destroying them, is widely used.

Various attempts have been made to develop polymeric materials having antibacterial activity using such photodynamic reaction, and for example, a method of melting a silicone resin or the like and then mixing the melted resin with a photosensitizer, and a method of using a coating solution formed by dissolving a silicone resin and a photosensitizer in a solvent, are known.

However, according to the method of melting a silicone resin and mixing it with a photosensitizer, since dispersibility between the photosensitizer and the silicone resin is low, the photosensitizer in the silicone resin may be aggregated while not being homogeneously distributed. In addition, when melted with the silicone resin, since it is impossible to adjust the thickness of the silicon after melting, it is limited in that it is not easy to produce products in accordance with applications and uses, or it is not suitable for mass production.

Moreover, when a coating solution formed by dissolving a silicone resin and a photosensitizer in a solvent is used, it is known that a certain level of antibacterial activity can be achieved without being severely limited in the field of application. However, it is not easy to produce active oxygen to such an extent that sufficient antibacterial activity can be exhibited when light in the visible light region is used, and the produced active oxygen is present only for a very short period of time. Thus, there is a limitation in that an excessive amount of light energy should be irradiated for a relatively long period of time.

BRIEF SUMMARY OF THE INVENTION

According to the present disclosure, there is provided a photocurable antibacterial coating composition and an antibacterial coating film, which can maintain high antibacterial activity for a long period of time even when using light in a visible light region, and can also control the antibacterial activity in an appropriate range according to the use thereof. In the present disclosure, there is provided an antibacterial polymer coating composition including a (meth)acrylate-based monomer or oligomer containing an alkylene oxide having 1 to 10 carbon atoms; a compound represented by the following Chemical Formula 1; and a photoinitiator:

[Chemical Formula 1]

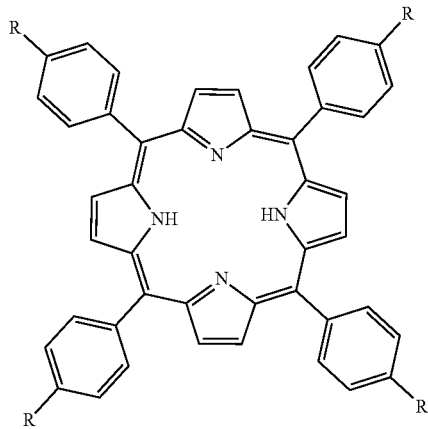

(in Chemical Formula 1, at least one of R is

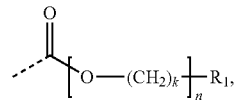

and the rest are hydrogen, $R_1$ is hydrogen, C1 to C5 alkyl, or C1 to C5 alkoxy, k is an integer of 1 to 5, and n is an integer of 1 to 20.)

In the present disclosure, there is also provided an antibacterial polymer film including a cured product of the antibacterial polymer coating composition.

In the present disclosure, there is also provided an antibacterial polymer film including a substrate layer including a polymer resin containing a (meth)acrylate-based repeating unit having an introduced alkylene oxide functional group having 1 to 10 carbon atoms, and a compound represented by the following Chemical Formula 1 dispersed in the substrate layer, wherein antibacterial activity measured according to JIS R 1702 (KS L ISO 27447; 2011) is 99% or more.

Hereinafter, the antibacterial polymer coating composition and the antibacterial polymer film according to the specific embodiments of the present disclosure will be described in more detail.

In the present disclosure, the term "(meth)acrylate" includes both acrylate and methacrylate.

According to an embodiment of the present disclosure, there is provided an antibacterial polymer coating composition including a (meth)acrylate-based monomer or oligomer containing an alkylene oxide having 1 to 10 carbon atoms; a compound represented by the Chemical Formula 1; and a photoinitiator.

The present inventors conducted research on materials having functionalities such as antibacterial activity using a photosensitizer, and have found through experiments that a coating composition produced by mixing 1) a (meth)acrylate-based monomer or oligomer containing an alkylene oxide having 1 to 10 carbon atoms, 2) a compound represented by the Chemical Formula 1, and 3) a photoinitiator is not only easily applicable to various fields and is suitable for mass production, but can also realize high antibacterial activity even when applying light in a visible light region during production of a polymer film or a polymer molded product by synergistic effects of the materials. Particularly, they have found that generated active oxygen remains for a long time compared to previously known antibacterial materials, and thus the coating composition can achieve high antibacterial efficiency. The present invention has been completed on the basis of such findings.

Specifically, the antibacterial polymer coating composition can realize remarkably excellent antibacterial activity of a polymer film or a polymer molded product manufactured therefrom by the synergistic effect of simultaneously including 1) a (meth)acrylate-based monomer or oligomer containing an alkylene oxide having 1 to 10 carbon atoms and 2) a compound represented by the Chemical Formula 1.

1) Specifically, in a polymer film or a polymer molded product manufactured using the antibacterial polymer coating composition, a predetermined polymer structure derived from the (meth)acrylate-based monomer or oligomer containing an alkylene oxide having 1 to 10 carbon atoms may be formed. More specifically, a polymer resin including a (meth)acrylate-based repeating unit containing an alkylene oxide having 1 to 10 carbon atoms may be contained in the polymer structure formed as described above.

Therefore, the polymer film and the polymer molded product are excellent in wettability to water ($H_2O$) based on hydrophilicity of the alkylene oxide having 1 to 10 carbon atoms in the polymer structure formed above, and may retain atmospheric moisture even without any treatment. In this connection, the polymer film or the polymer molded product can have high surface energy of 32 mN/m or more, for example 32 mN/m or more and 50 mN/m or less.

When the polymer film or the polymer molded product having such high surface energy is irradiated with light in a visible light region, it may have specific air permeability, for example oxygen permeability, of 5 to 100 cc/m$^2$ day, 20 to 90 cc/m$^2$ day, or 25 to 80 cc/m$^2$ day. Active oxygen may be more efficiently generated on the surface of the polymer film or the polymer molded product, and also it becomes easier for the generated active oxygen to diffuse into the polymer film or the polymer molded product. Further, the residence time of the active oxygen diffused into the inside may be greatly increased. Effective production of active oxygen on the surface of the polymer film or polymer molded product, easy diffusion to the inside thereof, and improvement of the lifetime of the diffused active oxygen are consequently factors for improving the antibacterial properties of the polymer film or the polymer molded product.

2) In addition, the polymer film or the polymer molded product manufactured using the antibacterial polymer coating composition may include a compound represented by the following Chemical Formula 1, which is dispersed in the polymer structure.

If a coating composition is prepared by mixing the (meth)acrylate-based monomer or oligomer containing an alkylene oxide having 1 to 10 carbon atoms with TCPP(4,4',4'',4'''-(porhirin-5,10,15,20-tetrayl)tetrakis(benzoic acid)) generally known as a photosensitizer and a photoinitiator, there is a limitation in improving the antibacterial properties of the polymer film or the polymer molded product manufactured therefrom.

Specifically, a generally known photosensitizer such as TCPP has at least one carboxyl group in its molecular structure as a substituent. The TCPP has a polarity due to its molecular structure including a carboxyl group, but the structure excluding the carboxyl group has a relatively large number of carbon atoms, thereby limiting its solubility in water.

In contrast, the compound represented by the Chemical Formula 1 includes a polymer chain represented by R instead of the terminal carboxyl group in TCPP.

More specifically, the compound represented by the Chemical Formula 1 has a TCPP-based structure in which at least one carboxyl group of TCPP is coupled with polyethylene glycol. Specifically, the polyethylene glycol structure has excellent solubility in water and may retain atmosphere moisture even without any treatment.

Therefore, the compound represented by the Chemical Formula 1 having excellent hydrophilicity compared to TCPP may contribute to remarkably improve the antibacterial properties of the polymer film or the polymer molded product manufactured therefrom, while basically functioning as a photosensitizer.

According to the experimental examples to be described later, the synergistic effect of 1) the (meth)acrylate-based monomer or oligomer containing an alkylene oxide having 1 to 10 carbon atoms, and 2) the compound represented by the Chemical Formula 1 is experimentally supported.

Hereinafter, the components of the antibacterial polymer coating composition will be described in detail.

1) In the molecular structure of the (meth)acrylate-based monomer or oligomer containing an alkylene oxide having 1 to 10 carbon atoms, the alkylene oxide having 1 to 10 carbon atoms may be located at the end of the (meth)acrylate-based monomer or oligomer or in the middle of the molecule thereof. Further, the (meth)acrylate-based monomer or oligomer containing an alkylene oxide having 1 to 10 carbon atoms may be a mono(meth)acrylate-based monomer or oligomer containing an alkylene oxide having 1 to 10 carbon atoms, or a di(meth)acrylate-based monomer or oligomer containing an alkylene oxide having 1 to 10 carbon atoms.

For example, the (meth)acrylate-based monomer or oligomer containing an alkylene oxide having 1 to 10 carbon atoms may be a di(meth)acrylate-based monomer or oligomer in which an alkylene oxide having 1 to 10 carbon atoms is contained in the middle of the molecule. In this case, it may be represented by the following Chemical Formula 2:

[Chemical Formula 2]

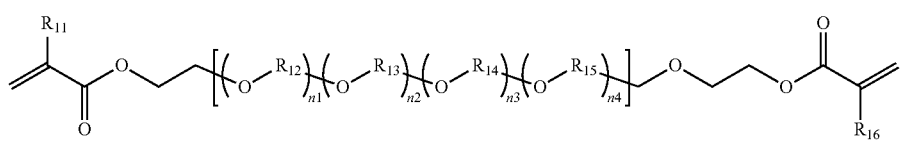

in Chemical Formula 2, $R_{11}$ and $R_{16}$ are each independently hydrogen or C1 to C3 alkyl; $R_{12}$ to $R_{15}$ are the same as or different from each other, and are each independently C1 to C4 alkylene; and n1 to n4 represent an addition mole number of alkylene oxide repeating units and are the same as or different from each other, and are each independently an integer of 0 to 13, and n1+n2+n3+n4 is 1 to 13, in which random or block phases may be formed by a mixed composition of one or more of the alkylene oxides.

A molar ratio of the alkylene oxide functional group to the (meth)acrylate-based functional group may be 0.5 or more and less than 18, per 1 mole of the (meth)acrylate-based monomer or oligomer containing an alkylene oxide having 1 to 10 carbon atoms. That is, a value obtained by dividing the number of moles of ethylene oxide by the number of moles of the acrylate-based functional group per 1 mole of the (meth)acrylate-based monomer or oligomer containing an alkylene oxide having 1 to 10 carbon atoms may be 0.5 or more and less than 18.

As the molar ratio increases within the above range, hydrophilicity of the (meth)acrylate-based monomer or oligomer containing an alkylene oxide having 1 to 10 carbon atoms is increased. Thus, the surface energy of the polymer film or the polymer molded product manufactured therefrom is increased, and the oxygen permeability is increased, thereby further increasing the antibacterial property.

When the number of moles of the (meth)acrylate-based functional group is excessively small even if the number of moles of the alkylene oxide having 1 to 10 carbon atoms per 1 mole of the (meth)acrylate-based monomer or oligomer is the same, it is necessary to irradiate visible light of a relatively high intensity in order to manufacture a polymer film or a polymer molded product. However, photobleaching may occur in the polymer film or the polymer molded product manufactured by light irradiation of a high intensity in this way. In the polymer film or polymer molded product in which photobleaching has occurred, the amount of active oxygen species or free radicals generated is reduced. This problem may lead to a decrease in antibacterial properties. The upper limit of the molar ratio takes these problems into consideration.

On the other hand, in a case where it is less than the above range, when the number of moles of the (meth) acrylate-based functional group is excessively large even if the number of moles of the alkylene oxide having 1 to 10 carbon atoms per 1 mole of the (meth)acrylate-based monomer or oligomer is the same, film strength of the polymer film or polymer molded product prepared is increased, oxygen permeability is greatly reduced, and the amount of active oxygen generated and its lifetime are reduced, resulting in a reduction in antibacterial properties. The lower limit of the above molar ratio (note: [EO]/[Acyl]) takes these problems into consideration.

Specifically, as the (meth)acrylate-based monomer or oligomer containing an alkylene oxide having 1 to 10 carbon atoms, an appropriate one according to the intended characteristics within the range where a molar ratio of the alkylene oxide functional group to the (meth)acrylate-based functional group is 0.5 or more and less than 18, and more specifically, 1 or more and less than 18, 1 or more and less than 17, 1 or more and less than 16, 1 or more and less than 15, or 1 or more and 13 or less may be used to control the degree of hydrophilicity of the polymer film or the polymer molded product to be manufactured and to ultimately control the antibacterial activity.

The (meth)acrylate-based monomer or oligomer containing an alkylene oxide having 1 to 10 carbon atoms may have a predetermined molecular weight in consideration of the specific use and physical properties of the antibacterial polymer coating composition, and for example, it may have a weight average molecular weight of 500 g/mol to 10000 g/mol. As used herein, the weight average molecular weight means a weight average molecular weight measured by the GPC method.

In Chemical Formula 1, one, two, three, or four of R are

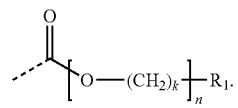

Herein, when two or more of R are

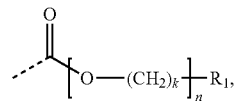

their structures may be the same. For example, four of R may be

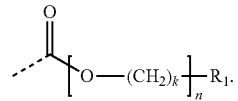

In addition, $R_1$ may be hydrogen, methyl, or methoxy, and k may be 2 or 3.

In Chemical Formula 1, n may be an integer of 1 or more, 2 or more, 3 or more, 4 or more, or 5 or more; and 20 or less, 19 or less, 18 or less, 17 or less, 16 or less, 15 or less, 14 or less, 13 or less, 12 or less, 11 or less, or 10 or less.

Herein, n refers to the number of moles of R per 1 mole of the compound represented by the Chemical Formula 1. Since R corresponds to a structure having hydrophilicity, an increase in n may mean an increase in hydrophilicity. In this regard, according to the experimental example described below, when n is 2 to 10, the antibacterial activity of the polymer film is confirmed to be 99% or more, 99.5% or more, 99.6% or more, 99.7% or more, 99.8% or more, or 99.9% or more and 99.9999% or less, as measured according to JIS R1702 (KS L ISO 27447; 2011). In particular, it is confirmed that the antibacterial activity of the polymer film in the case where n is 5 or more and 10 or less is further improved (>99.9%) than the case where n is 2 or more and 4 or less.

A representative example of the compound represented by the Chemical Formula 1 is as follows:

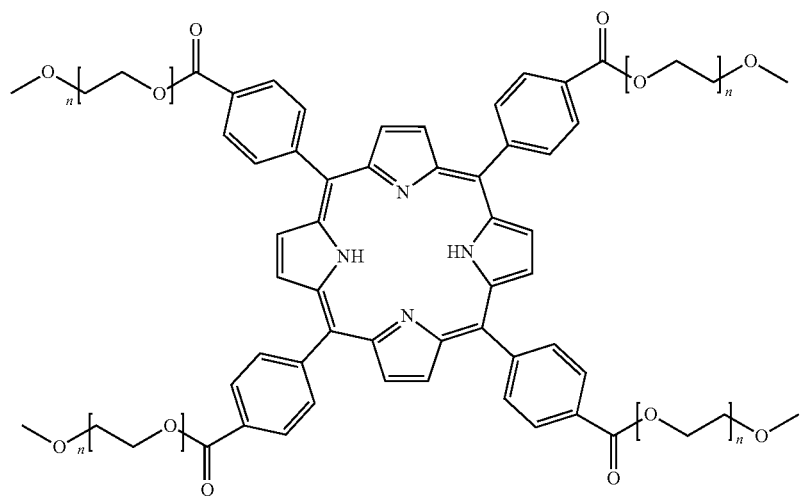

The compound represented by the Chemical Formula 1 may be prepared by the same method as in Reaction Scheme 1 below.

known in the art may be used without limitation. The manufacturing method may be more specified in the preparation example to be described later.

[Reaction Scheme 1]

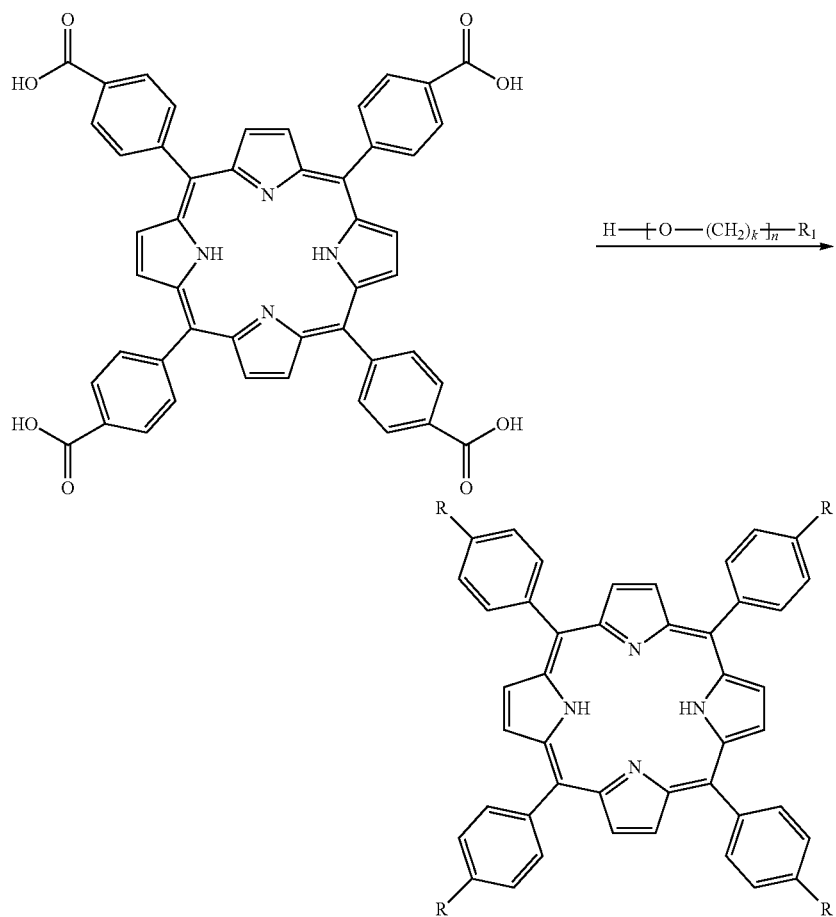

The Reaction Scheme 1 is a reaction for replacing a carboxyl group with an ester or a ketone, and any method As described above, when the antibacterial polymer coating composition is irradiated with light in a visible light region after photocuring, the compound represented by the Chemical Formula 1 may be excited to generate active oxygen or the like. For this purpose, the antibacterial polymer coating composition may contain the compound represented by the Chemical Formula 1 in a predetermined amount. Specifically, the antibacterial polymer coating composition may include 0.01 to 5 parts by weight of the compound represented by the Chemical Formula 1 based on 100 parts by weight of the (meth)acrylate-based monomer or oligomer containing an alkylene oxide having 1 to 10 carbon atoms.

As the photosensitizer, a commonly known compound may be used together with the compound represented by the Chemical Formula 1. For example, porphine-based compounds, porphyrin-based compounds, chlorin-based compounds, bacteriochlorin-based compounds, phthalocyanine-based compounds, naphthalocyanine-based compounds, 5-amino valine ester-based compounds, or a combination of two or more thereof may be used together with the compound represented by the Chemical Formula 1.

In order to achieve higher antibacterial activity and antibacterial activity-maintaining performance in the final product manufactured from the antibacterial polymer coating composition, it is preferable to use a porphine-based compound or a porphyrin-based compound. More preferably, as the photosensitizer, a porphine-based compound or a porphyrin-based compound in which 1 to 8 phenyl groups introduced with an alkoxy having 1 to 10 carbon atoms are introduced such as 5,10,15,20-tetrakis(4-methoxyphenyl)-porphine may be used.

If the exemplified photosensitizer is used in combination with the compound represented by the Chemical Formula 1, a total amount thereof may be 0.01 to 5 parts by weight based on 100 parts by weight of the (meth)acrylate-based monomer or oligomer containing an alkylene oxide having 1 to 10 carbon atoms.

However, it is possible to achieve high antibacterial activity and antibacterial activity-maintaining performance in the final product by using only the compound represented by the Chemical Formula 1, and it is not necessary to use other photosensitizers.

3) The antibacterial polymer coating composition may contain a photoinitiator in a predetermined amount. Specifically, the antibacterial polymer coating composition may include 0.001 to 10 parts by weight of the photoinitiator based on 100 parts by weight of the (meth)acrylate-based monomer or oligomer containing an alkylene oxide having 1 to 10 carbon atoms.

Specific examples of the photoinitiator are not limited, and commonly known photoinitiators may be used without particular limitation. Specific examples of the photoinitiator include benzophenone-based compounds, acetophenone-based compounds, biimidazole-based compounds, triazine-based compounds, oxime-based compounds, or a mixture of two or more thereof.

The antibacterial polymer coating composition may further include an organic solvent or a surfactant.

The organic solvent may be added at the time of mixing the respective components contained in the antibacterial polymer coating composition, or may be contained in the antibacterial polymer coating composition while the respective components are added in a state of being dispersed in or mixed with the organic solvent. For example, the antibacterial polymer coating composition may include the organic solvent such that a total solids concentration of the components contained therein is 1 wt % to 80 wt %, or 2 to 50 wt %.

Non-limiting examples of the organic solvent include ketones, alcohols, acetates, and ethers, or a mixture of two or more thereof. Specific examples of the organic solvent include ketones such as methyl ethyl ketone, methyl isobutyl ketone, acetylacetone, or isobutyl ketone; alcohols such as methanol, ethanol, n-propanol, i-propanol, n-butanol, i-butanol, or t-butanol; acetates such as ethyl acetate, i-propyl acetate, or polyethylene glycol monomethyl ether acetate; ethers such as tetrahydrofuran and propylene glycol monomethyl ether; or a mixture of two or more thereof.

The type of the surfactant is also not particularly limited, and an anionic surfactant, a cationic surfactant, an amphoteric surfactant, a nonionic surfactant, or the like may be used.

The antibacterial polymer coating composition may contain 0.001 to 20 parts by weight of the surfactant based on 100 parts by weight of the (meth)acrylate-based monomer or oligomer containing an alkylene oxide having 1 to 10 carbon atoms.

Meanwhile, the antibacterial polymer coating composition may optionally further include a monomer or oligomer having a monofunctional or polyfunctional functional group, in addition to an urethane acrylate-based oligomer or polymer having a molar ratio of the urethane functional group relative to the (meth)acrylate-based functional group of 1 to 10.

Specifically, the antibacterial polymer coating composition may include a monomer or oligomer containing a (meth)acrylate or a vinyl group which is different from the (meth)acrylate-based monomer or oligomer containing an alkylene oxide having 1 to 10 carbon atoms. Specifically, the photopolymerizable compound may include a monomer or oligomer containing one or more, two or more, or three or more of (meth)acrylate or vinyl groups. Specific examples of the monomer or oligomer containing the (meth)acrylate include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or alternatively an epoxide acrylate oligomer, an ether acrylate oligomer, a dendritic acrylate oligomer, or a mixture of two or more thereof. In this case, the molecular weight of the oligomer is preferably 1,000 to 10,000. Specific examples of the monomer or oligomer containing the vinyl group may include divinylbenzene, styrene, and para-methylstyrene.

Meanwhile, according to another embodiment of the present disclosure, there may be provided an antibacterial polymer film including a cured product of the antibacterial polymer coating composition.

As described above, the antibacterial polymer film prepared by curing the antibacterial polymer coating composition is easily applicable to various fields and is suitable for mass production, and it can also realize high antibacterial activity even when applying light in a visible light region. Particularly, generated active oxygen remains for a long period of time compared to previously known antibacterial materials, and thus the antibacterial polymer film can achieve high antibacterial efficiency.

The antibacterial polymer film may be obtained by coating the antibacterial polymer coating composition onto a predetermined substrate and photo-curing the coated product. The specific type and thickness of the substrate are not particularly limited, and substrates that are known to be used for the production of a conventional polymer film may be used without particular limitation.

A method and device commonly used for coating the antibacterial polymer coating composition may be used without particular limitation, and for example, a bar coating method such as a Meyer bar method, a gravure coating method, a 2-roll reverse coating method, a vacuum slot die coating method, a 2 roll coating method, or the like may be used.

A coating thickness of the antibacterial polymer coating composition may be determined according to the use of the antibacterial polymer film to be finally produced. For example, the antibacterial polymer coating composition may be coated (applied) in a thickness of 1 μm to 1,000 μm.

In the step of photocuring the antibacterial polymer coating composition, ultraviolet light or visible light having a wavelength of 200 to 400 nm may be irradiated, and an exposure amount during irradiation is preferably 50 to 2000 mJ/cm$^2$. The exposure time is also not particularly limited, and may be appropriately changed depending on the exposure device used, the wavelength of the irradiation light, or the exposure amount.

Further, in the step of photocuring the antibacterial polymer coating composition, nitrogen purging may be performed to apply nitrogen atmosphere conditions.

Meanwhile, according to another embodiment of the present disclosure, there may be provided an antibacterial polymer film including a substrate layer including a polymer resin containing a (meth)acrylate-based repeating unit having an introduced alkylene oxide functional group having 1 to 10 carbon atoms, and a photosensitizer dispersed in the substrate layer, wherein the antibacterial polymer film has a surface energy of 32 mN/m or more.

As the substrate layer includes the (meth)acrylate-based repeating unit having an introduced alkylene oxide functional group having 1 to 10 carbon atoms, a predetermined polymer structure may be formed therein.

For example, the polymer resin containing a (meth)acrylate-based repeating unit having an introduced alkylene oxide functional group having 1 to 10 carbon atoms may be one in which an alkylene oxide functional group having 1 to 10 carbon atoms is introduced at the end of or in the middle of the (meth)acrylate-based repeating unit.

Further, the antibacterial polymer film may have antibacterial activity of 99% or more, 99.5% or more, 99.6% or more, 99.7% or more, 99.8% or more, or 99.9% to 99.9999%, as measured according to JIS R1702 (KS L ISO 27447; 2011, Fine ceramics-Test method for antibacterial activity of semiconducting photocatalytic materials).

The antibacterial polymer film may have a thickness of 10 μm to 10,000 μm.

Meanwhile, as an absolute value of the addition mole number of alkylene oxide functional groups in the polymer resin contained in the substrate layer increases, the surface energy of the antibacterial polymer film is increased. However, if a relative molar ratio of alkylene oxide functional groups to (meth)acrylate-based functional groups is too high, the antibacterial property may be rather lowered as described above.

For example, as the antibacterial polymer film includes the (meth)acrylate-based repeating unit having an introduced alkylene oxide functional group having 1 to 10 carbon atoms, it may have a high surface energy of 32 mN/m or more.

As the antibacterial polymer film has a high surface energy of 32 mN/m or more, not only may active oxygen be more efficiently generated on the surface thereof, but also the amount of active oxygen diffused to the inside from the surface increases and the residence time of the active oxygen therein can be greatly increased. As a result, the antibacterial polymer film may have specific air permeability, for example, oxygen permeability of 5 to 100 cc/m$^2$·day, 20 to 90 cc/m$^2$·day, or 25 to 80 cc/m$^2$·day. Thus, active oxygen may be more efficiently generated on the surface thereof, and the time during which the active oxygen remains therein may be greatly increased.

A more detailed description thereof is as described above.

More specifically, the antibacterial polymer film may have a singlet oxygen lifetime of 0.4 ms or more, 0.8 ms, or 0.10 ms to 0.80 ms, as measured by a time-resolved phosphorescence laser spectroscopy system.

Meanwhile, according to another embodiment of the present disclosure, there may be provided an electronic product including the above-mentioned antibacterial polymer film.

Examples of the electronic product are not particularly limited, and for example, the antibacterial polymer film may be applied to products where harmful bacteria (fungi, etc.) are easily grown, such as a humidifier, a water tank, a refrigerator, an air washer, an aquarium, and an air cleaner.

In order to generate active oxygen or radicals in the antibacterial polymer film, the electronic product may include a light irradiation device. In addition, the electronic product may further include a device for distributing the generated active oxygen or radicals, for example, an air circulation device.

Advantageous Effects

According to the present disclosure, there may be provided a photocurable antibacterial coating composition and an antibacterial coating film, which can maintain high antibacterial activity for a long period of time even when using light in a visible light region and can provide an antibacterial material suitable for mass production.

BRIEF DESCRIPTION OF THE DRAWINGS

FIG. 3 shows the result of the antibacterial activity of the polymer films of Examples and Comparative Examples according to Experimental Example 1.

Embodiments of the present invention are described in more detail by way of the examples provided below. However, the following examples are given for illustrative purposes only, and the scope of the present invention is not intended to be limited to or by these examples.

Preparation Example: Preparation of Raw Material

Preparation Example 1: Preparation of (Meth)Acrylate-Based Oligomer Containing an Alkylene Oxide Having 1 to 10 Carbon Atoms A (meth)acrylate-based oligomer containing an alkylene oxide having 1 to 10 carbon atoms was prepared according to the following Reaction Scheme.

Specifically, 14 g of PEG400 (polyethylene glycol 400) was dispersed in a mixed solution of 5 g of potassium carbonate (K2003) and 50 g of dimethyl sulfoxide, and then mixed for 30 minutes (0° C., N₂ purging conditions).

Figure 1:
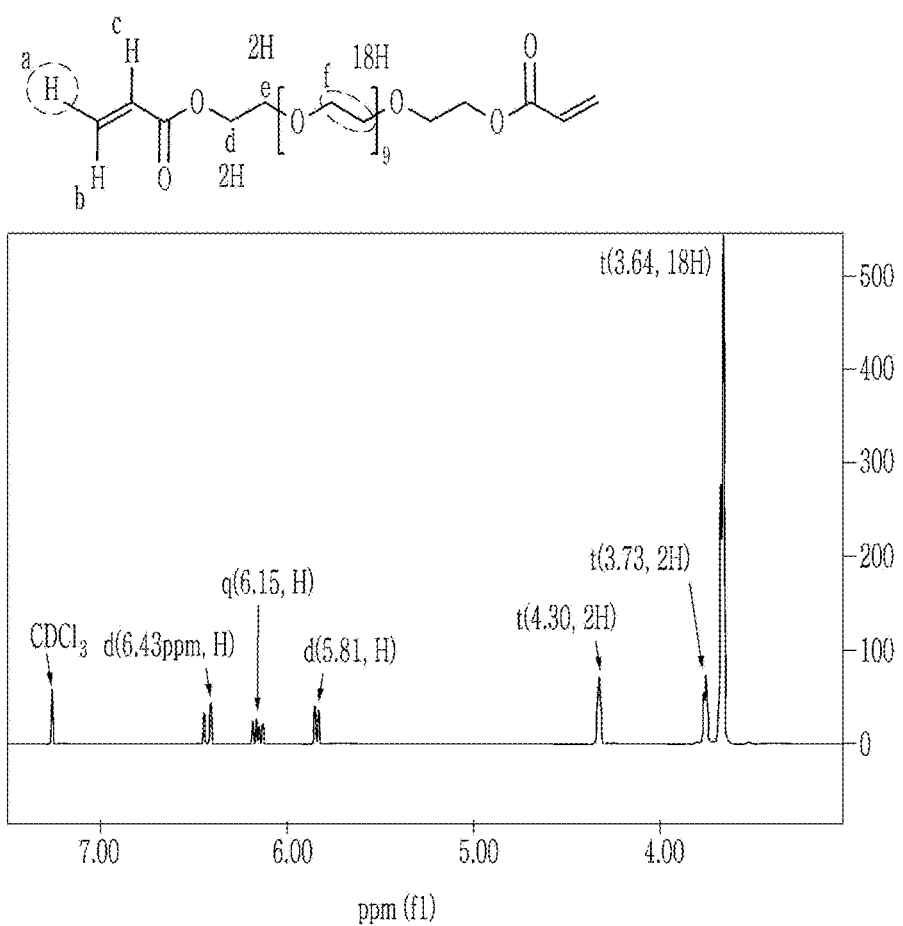
FIG. 1 shows the result of NMR analysis of the product of Preparation Example 1.

Then, 10 g of 2-chloroethyl acrylate (M.W. of 134.56 g/mol) was added thereto and reacted for 3 hours. The reaction product was obtained through a column, and it was confirmed whether an alkylene oxide (meth)acrylate of the following Reaction Scheme 1 was produced from the result of NMR analysis (FIG. 1) and GC-MS analysis (weight average molecular weight: 610.69).

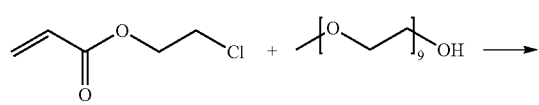

Preparation Example 2: Preparation of Photosensitizer (Compound Represented by Chemical Formula 1)

TCPP (4,4',4",4'"-(porphrin-5,10,15,20-tetrayl)tetrakis (benzoic acid); 1 eq) purchased from Sigma-Aldrich was dissolved in DMF, and then poly(ethylene glycol) monomethyl ether (weight average molecular weight: 400; 10 eq) was added thereto through a syringe at 0° C. After 10 minutes at 0° C., DMAP (4-(dimethylamino)pyridine; 1 eq) was added thereto. After 30 minutes at 0° C., EDC.HCl (N-(3-dimethylaminopropyl)-N'-ethylcarbodiimide hydrochloride; 10 eq) was added thereto. When the reaction was completed, DMF used as a solvent was dried to remove, and extracted with water. The extract was purified by column chromatography after removal of water using magnesium sulfate, thereby preparing a compound having the following structure among the compounds represented by the Chemical Formula 1.

In the above process, a weight average molecular weight of poly(ethylene glycol) monomethyl ether was adjusted to control n of the compound having the following structure. Herein, the smaller the weight average molecular weight of the poly(ethylene glycol) monomethyl ether, the smaller n the compound may have.

Accordingly, a compound having n of 2 to 4, a compound having n of 5 to 7, and a compound having n of 8 to 10 were obtained, and used in Example 1 (n=2~4), Example 2 (n=5~7), and Example 3 and Comparative Example 2 (n=8~10), respectively.

¹H NMR (500 MHz, CDCl₃, ppm): 8.82 (s, 8H), 8.47-8.46 (d, 8H), 8.30-8.29 (d, 8H), 4.68-4.66 (t, 8H), 4.00-3.97 (t, 8H), 3.82-3.80 (m, 8H) 3.76-3.74 (m, 8H), 3.65-3.59 (m, repeating unit), −2.81 (s, 2H)

MS: MALDI TOP-MS: m/z 1882~2851 [M+M]⁺

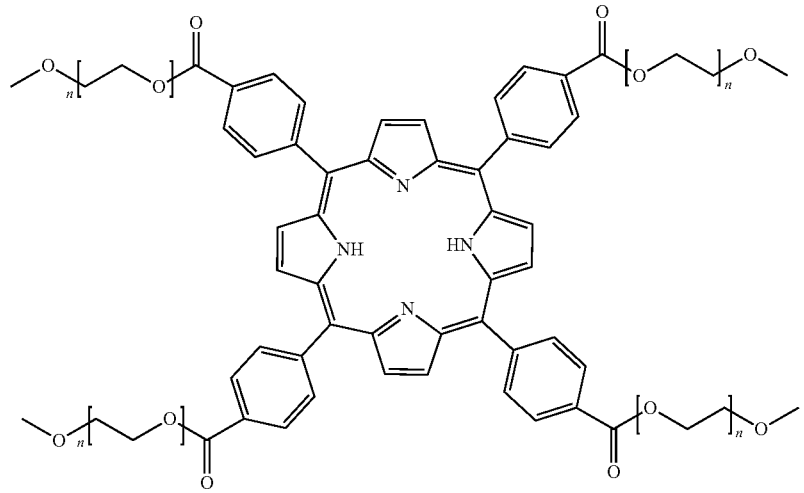

-continued

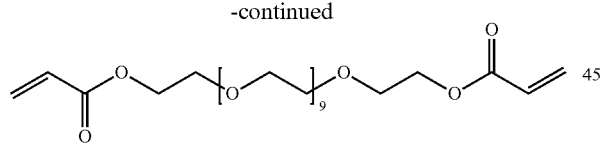

Example: Preparation of Antibacterial Polymer Coating Composition and Antibacterial Polymer Film

Example 1

100 g of the alkylene oxide (meth)acrylate-based oligomer of Preparation Example 1, 5 g of trimethylolpropane triacrylate (TMPTA), 1 g of the compound of Preparation Example 2 (n=2~4), 2 g of a photoinitiator (product name: Darocure TPO), 0.1 g of a surfactant (product name: RS90 manufactured by DIC), 50 g of toluene, and 50 g of ethanol were mixed to prepare an antibacterial polymer coating solution (50% solids concentration).

The antibacterial polymer coating solution (50% solids concentration) was coated using #10 bar, and then cured at a rate of 2 m/min using a UV lamp of 0.2 J/cm² to prepare an antibacterial polymer film (10 μm thick).

Example 2

An antibacterial polymer coating solution (50% solids concentration) and an antibacterial polymer film (10 μm thick) were prepared in the same manner as in Example 1, except that the compound of Preparation Example 2 (n=5~7) was used instead of the compound of Preparation Example 2 (n=2~4).

Example 3

An antibacterial polymer coating solution (50% solids concentration) and an antibacterial polymer film (10 μm thick) were prepared in the same manner as in Example 1, except that the compound of Preparation Example 2 (n=8~10) was used instead of the compound of Preparation Example 2 (n=2~4).

COMPARATIVE EXAMPLE

Comparative Example 1

Ethylene glycol dimethacrylate (EGDMA, Miramer M221, CAS no. 97-90-5) having the following structure was prepared instead of the alkylene oxide (meth)acrylate-based oligomer of Preparation Example 1.

In addition, TCPP having the following structure was prepared instead of the compound of Preparation Example 2 (n=2~4).

An antibacterial polymer coating solution (50% solids concentration) and an antibacterial polymer film (10 μm thick) were prepared in the same manner as in Example 1, except that the ethylene glycol dimethacrylate and TCPP were used.

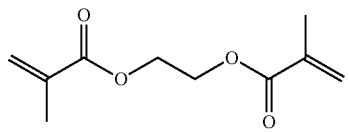

Comparative Example 2

An antibacterial polymer coating solution (50% solids concentration) and an antibacterial polymer film (10 μm thick) were prepared in the same manner as in Comparative Example 1, except that the compound of Preparation Example 2 (n=8~10) was used instead of the TCPP.

Comparative Example 3

An antibacterial polymer coating solution (50% solids concentration) and an antibacterial polymer film (10 μm thick) were prepared in the same manner as in Comparative Example 1, except that the alkylene oxide (meth)acrylate-based oligomer of Preparation Example 1 was used instead of the ethylene glycol dimethacrylate.

Experimental Example

Experimental Example 1: Measurement of Antibacterial Activity of Polymer Films of Examples and Comparative Examples 1) Preparation of Bacteria Suspension

*E. coli* ATCC 8739, the standard *E. coli* specified in KS L ISO 27447, was used as test bacteria. The *E. coli* ATCC 8739 strain was inoculated in LB nutrient medium using a platinum loop, cultivated at 37° C. for 16 to 24 hours and then stored in a 5° C. refrigerator. Within one month, a second culture was repeated by replicating the above procedure. The maximum number of CFU (colony forming unit) should be 10 in the second culture. The LB nutrient medium was prepared by mixing 25 g/L Luria Broth powder and 15 g/L agar powder (available from Sigma-Aldrich) in distilled water, sterilizing them in autoclave, and then quantifying them in a petri dish when the temperature dropped to ~40° C.

The bacterial culture was centrifuged to separate the bacteria from the LB liquid medium and the bacteria were transferred to saline. The suspension was diluted so that an absorption value of the bacteria-saline solution was 0.5 at 600 nm using a spectrophotometer, and the bacterial suspension was used for the test.

Figure 2:
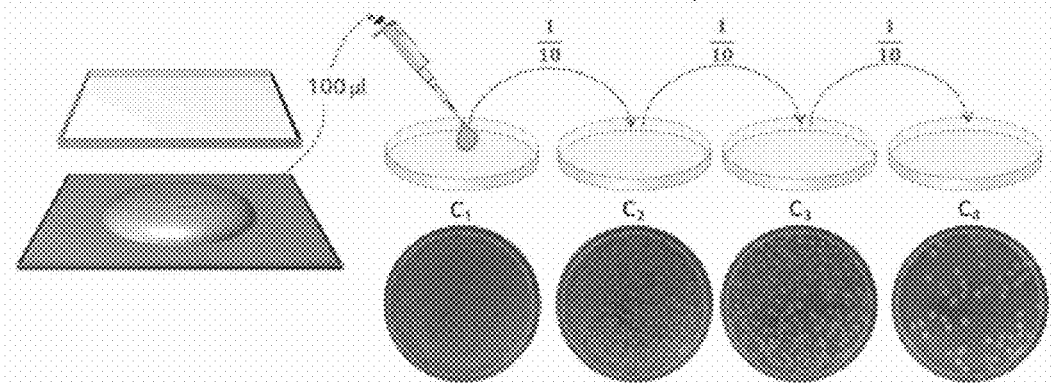
FIG. 2 schematically shows a method for measuring the antibacterial activity of the polymer films of Examples and Comparative Examples according to JIS R 1702 (KS ISO 27447) in Experimental Example 1.

A specific dilution method may refer to FIG. 2. Each plate was diluted by 1/10, so the number of CFU was reduced by 1/10. An amount of the suspension used for plating was 0.1 ml. The number of CFU of $C_4$ was 299 and the amount of liquid used was 0.1 ml, so 299 CFU/0.1 ml=2,990 CFU/ml. The number of CFU of $C_1$ was ~3.0×10$^6$ CFU/ml, which is multiplied by 1,000, and $C_1$ was 1/10 dilution of the bacterial stock solution ($C_0$), so the number of CFU in the bacterial suspension was 3.0×10$^7$ CFU/ml.

2) Bacteria Inoculation on Test Specimen

After weighing and placing 0.2 mL of each bacterial suspension ($C_1$, $C_2$, $C_3$, $C_4$) on the test specimens prepared above, a polypropylene adhesive film having a transmittance of 80% or more was placed thereon to prepare a sandwich structure including a microbial suspension located between the polymer film carrying a photocatalyst sample and the adhesive film.

3) Antibacterial Test (Light Condition: Light)

Each test specimen was placed under a light source and irradiated with light at room temperature (25° C.) for 5 hours. The light used was subjected to conditions of 405 nm and 2 mW/cm$^2$, and the distance between the test specimen and the light source was 1 cm.

Figure 3:
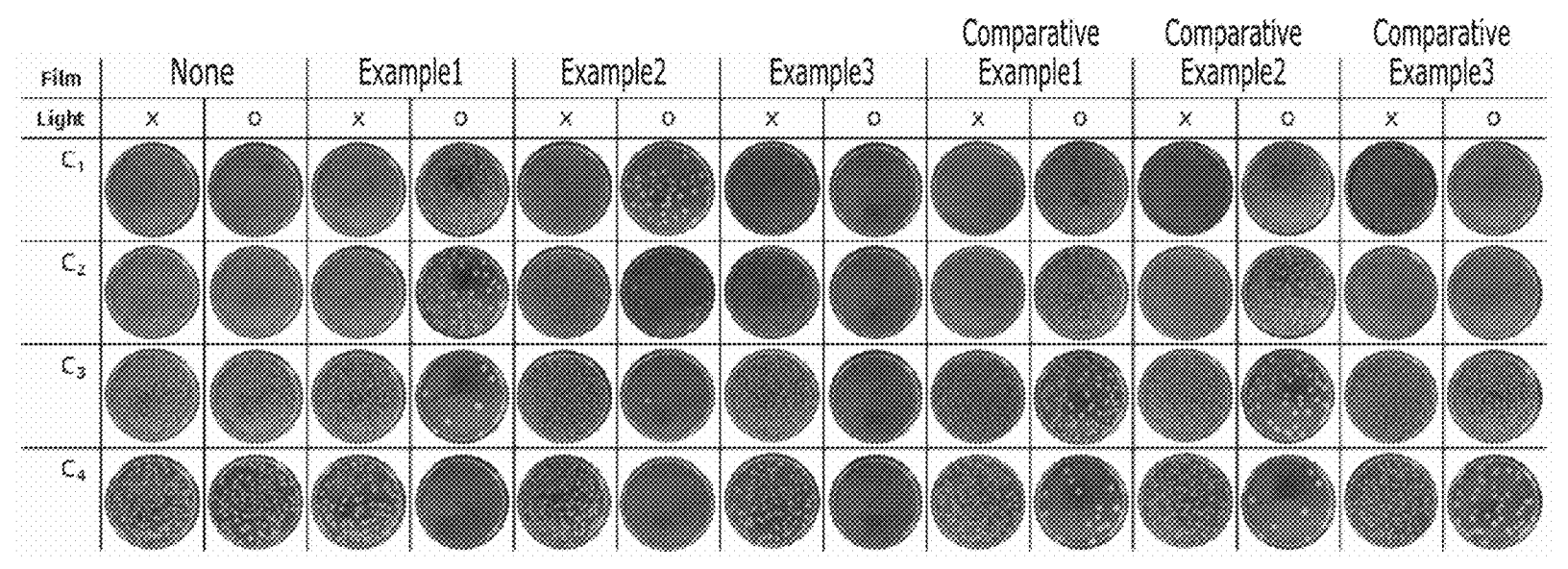

The results of the experiment are shown in Table 1 and FIG. 3.

TABLE 1

| | Addition mole number of EO per 1 mole of oligomer | Mole Number of EG per 1 mole of photosensitizer | Antibacterial activity (%) |
|---|---|---|---|
| Example 1 | 9 | 2~4 | 99.5 |
| Example 2 | 9 | 5~7 | >99.9 |
| Example 3 | 9 | 8~10 | >299.9 |
| Comparative Example 1 | 0 | 0 | <90 |
| Comparative Example 2 | 0 | 8~10 | 90 |
| Comparative Example 3 | 9 | 0 | 97 |

* Note:
The addition mole number of EO means the addition mole number of alkylene oxide repeating units contained per 1 mole of (meth)acrylate-based monomer or oligomer used as a raw material in each of Examples and Comparative Examples.

In addition, the mole number of EG means the number of moles of ethylene glycol contained per 1 mole of the photosensitizer used as a raw material in each of Examples and Comparative Examples.

What is claimed is:

1. An antibacterial polymer coating composition comprising
   a (meth) acrylate-based monomer or oligomer containing an alkylene oxide having 1 to 10 carbon atoms;
   a compound represented by the following Chemical Formula 1; and
   a photoinitiator:

[Chemical Formula 1]

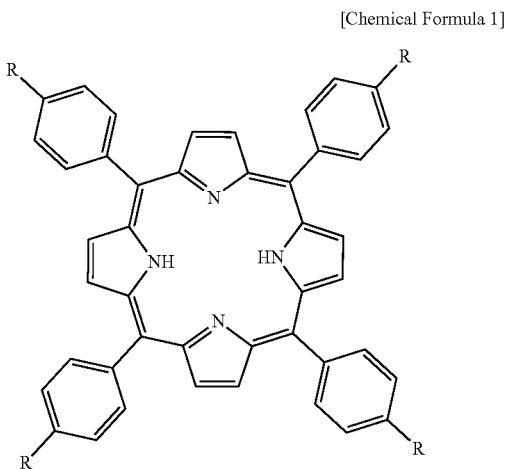

in the Chemical Formula 1,
   at least one R is

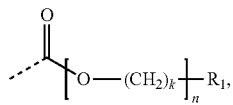

and each of the remaining R's is hydrogen,
   $R_1$ is hydrogen, C1 to C5 alkyl, or C1 to C5 alkoxy,
   k is an integer of 1 to 5, and
   n is an integer of 1 to 20.

2. The antibacterial polymer coating composition of claim 1,
   wherein in the Chemical Formula 1, all of the R's are

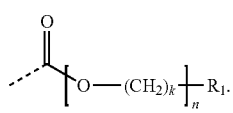

3. The antibacterial polymer coating composition of claim 1,
   wherein n is an integer of 2 to 10.

4. The antibacterial polymer coating composition of claim 1,
   wherein $R_1$ is hydrogen, methyl, or methoxy.

5. The antibacterial polymer coating composition of claim 1,
   wherein k is 2 or 3.

6. The antibacterial polymer coating composition of claim 1,
   wherein the (meth) acrylate-based monomer or oligomer is a mono (meth) acrylate-based monomer or oligomer containing an alkylene oxide having 1 to 10 carbon atoms; or a di (meth) acrylate-based monomer or oligomer containing an alkylene oxide having 1 to 10 carbon atoms.

7. The antibacterial polymer coating composition of claim 6,
   wherein the di (meth) acrylate-based monomer or oligomer containing an alkylene oxide having 1 to 10 carbon atoms is represented by the following Chemical Formula 2:

[Chemical Formula 2]

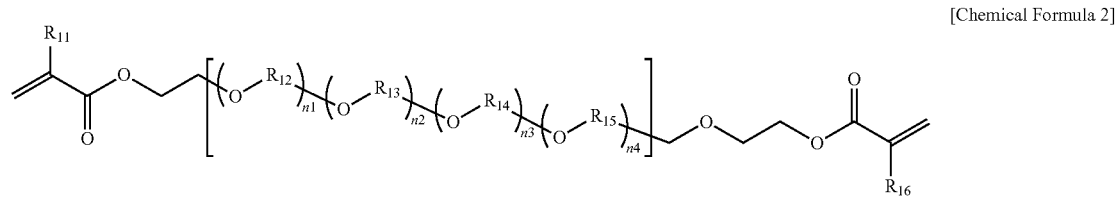

in the Chemical Formula 2, $R_{11}$ and $R_{12}$ are each independently hydrogen or C1 to C3 alkyl;
   $R_{12}$ to $R_{15}$ are the same as or different from each other, and are each independently C1 to C4 alkylene; and
   n1 to n4 represent an addition mole number of alkylene oxide repeating units and are the same as or different from each other, and are each independently an integer of 0 to 13, and n1+n2+n3+n4 is 1 to 13, in which random or block phases are formed by a mixed composition of one or more of the alkylene oxides.

8. The antibacterial polymer coating composition of claim 1,
   wherein the (meth) acrylate-based monomer or oligomer has a weight average molecular weight of 500 g/mol to 10000 g/mol.

9. The antibacterial polymer coating composition of claim 1,
   wherein 0.01 to 5 parts by weight of the compound represented by the Chemical Formula 1 is included based on 100 parts by weight of the (meth) acrylate-based monomer or oligomer.

10. The antibacterial polymer coating composition of claim 1,
    further comprising an organic solvent, a surfactant, or a mixture thereof.

11. The antibacterial polymer coating composition of claim 1,
further comprising a monomer or oligomer containing (meth) acrylate different from the (meth) acrylate-based monomer or oligomer containing an alkylene oxide having 1 to 10 carbon atoms; or a monomer or oligomer containing a vinyl group.

12. An antibacterial polymer film, comprising a cured product of the antibacterial polymer coating composition of claim 1.

13. An antibacterial polymer film, comprising a substrate layer including a polymer resin containing a (meth) acrylate-based repeating unit having an introduced alkylene oxide functional group having 1 to 10 carbon atoms, and a photosensitizer dispersed in the substrate layer,
wherein the photosensitizer includes a compound represented by the following Chemical Formula 1,
wherein an antibacterial activity as measured according to JIS R 1702 (KS L ISO 27447;
2011) is at least 99%,

[Chemical Formula 1]

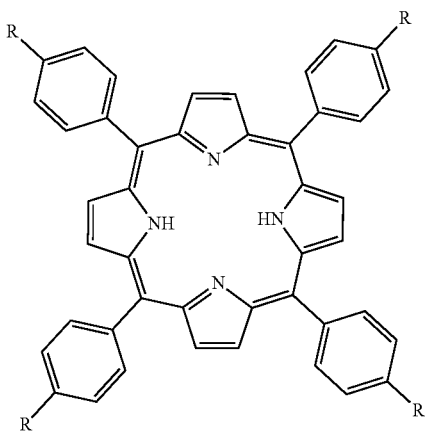

in the Chemical Formula 1,
at least one R is

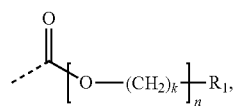

and each of the remaining R's is hydrogen,
$R_1$ is hydrogen, C1 to C5 alkyl, or C1 to C5 alkoxy,
k is an integer of 1 to 5, and
n is an integer of 1 to 20.

14. An electronic product comprising the antibacterial polymer film of claim 12.

15. The electronic product of claim 13,
wherein the electronic product is a humidifier, a refrigerator, an air washer, or an aquarium.

16. An electronic product comprising the antibacterial polymer film of claim 13.

17. The electronic product of claim 16,
wherein the electronic product is a humidifier, a refrigerator, an air washer, or an aquarium.

* * * * *